Feb. 14, 1939.  B. C. HASKIN  2,147,030
SUPPORT
Filed July 6, 1937    3 Sheets-Sheet 2
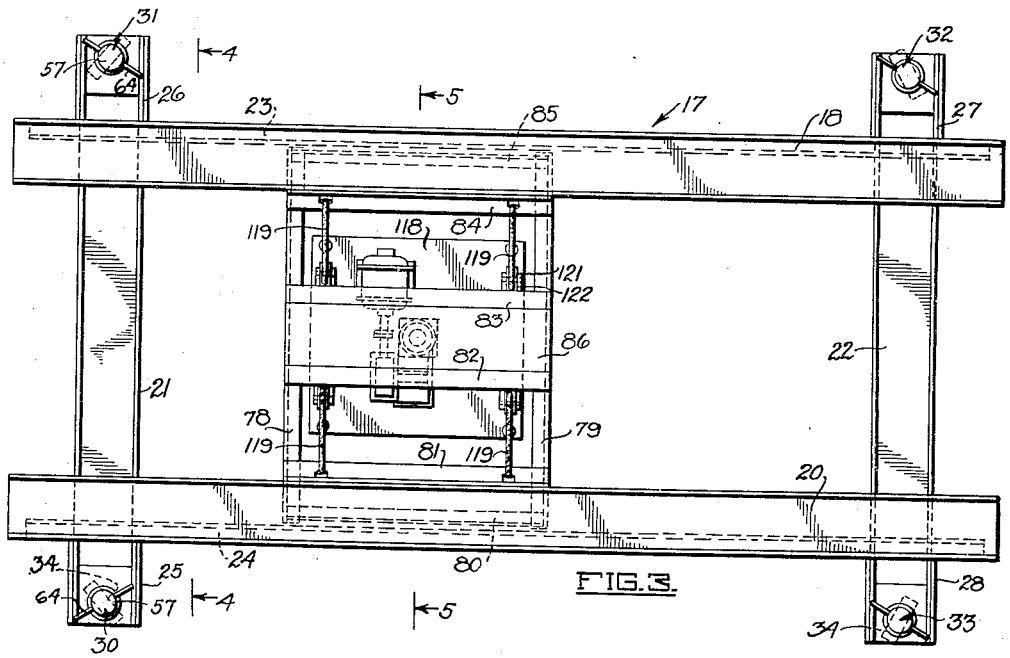
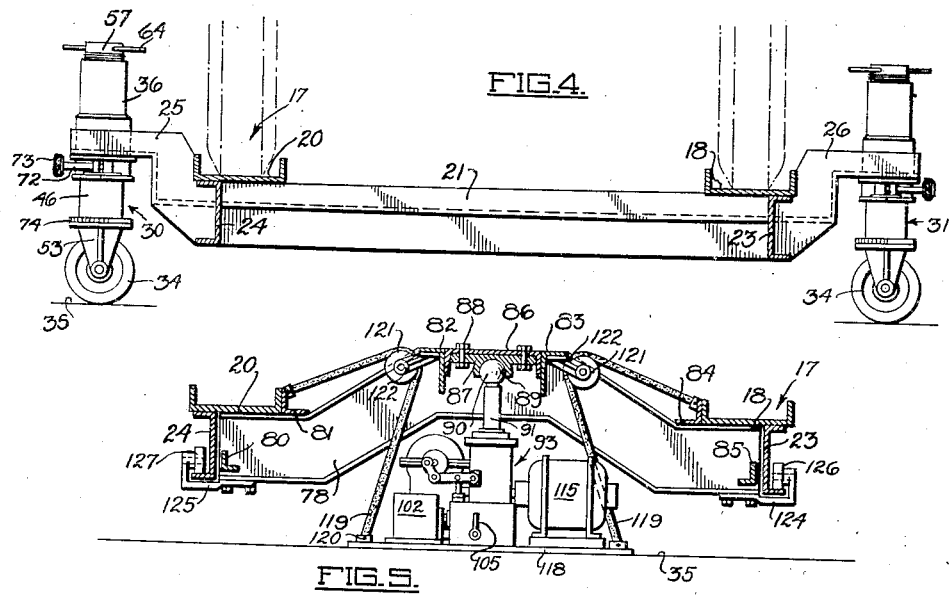
INVENTOR
BYRON C. HASKIN
BY
W E Beatty
ATTORNEY Feb. 14, 1939.  B. C. HASKIN  2,147,030
SUPPORT
Filed July 6, 1937  3 Sheets-Sheet 3
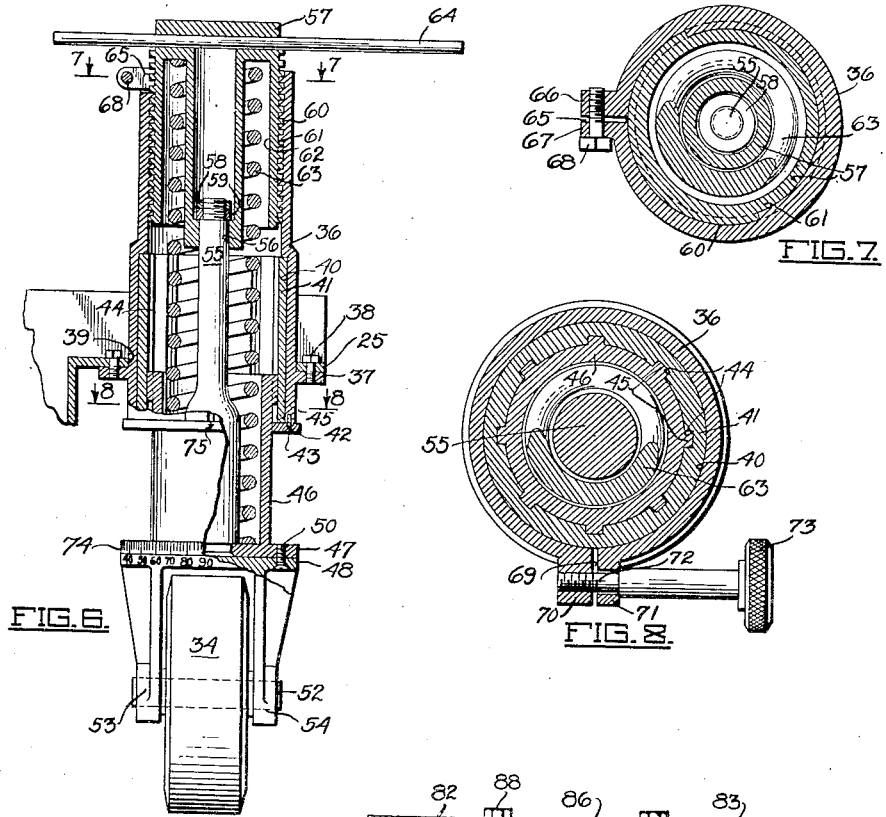
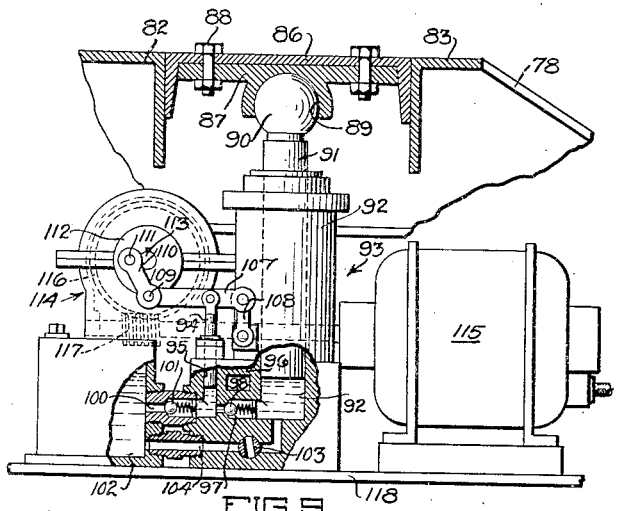
INVENTOR
BYRON C. HASKIN
BY
W. C. Beatty
ATTORNEY Patented Feb. 14, 1939

2,147,030

UNITED STATES PATENT OFFICE 2,147,030

SUPPORT

Byron C. Haskin, Beverly Hills, Calif., assignor to Warner Bros. Pictures, Inc., New York, N. Y., a corporation of California Application July 6, 1937, Serial No. 152,229

11 Claims. (Cl. 254—89)

This invention relates to supports and has particular reference to apparatus for supporting objects to be rocked or moved during photographing thereof by a motion picture camera.

The invention is particularly applicable to the production of composite motion pictures of the type wherein a previously photographed background component is projected upon the rear of a translucent screen with the foreground component, generally including actors and other foreground objects, situated in front of the screen. The combined foreground component and projected background picture are photographed by a motion picture camera directed toward the front of the screen to obtain a motion picture film which when processed and projected in the usual manner appears to have had the two components simultaneously photographed thereon from the same point of view.

In the majority of photographic procedures of the above type the foreground component must be moved during photographing in such a manner as to harmoniously correspond with the projected background component or at least to simulate a natural movement of such foreground component. Pictures which generally come under this class are the so-called "taxi shots" wherein a vehicle, for example an auto having occupants therein, comprising a foreground component, is photographed in front of a translucent screen having projected thereon from the rear a background picture of a road or runway on which the auto apparently is traveling. Herein it is necessary not only to jostle the auto during the photographing to simulate movement thereof over bumps, etc., but the auto must also be turned to face in the same direction as the projected picture of the road at every instant. That is, where the road is depicted as extending transversely across the optical axis of the camera or apparent viewpoint the auto must also be pointed in the same direction, whereas where the road is depicted as extending parallel to the camera axis the auto must also point correspondingly. During such turning and/or rocking movement of the foreground component, it is usually desirable that the main center of interest, generally actors associated with the foreground component, be shifted a minimum amount in relation to the camera axis, thus permitting such center of interest to remain centralized or to occupy the same portion of the picture throughout.

One object of the invention is to adjust the position of the center about which a supported object such as an auto, boat or other motion picture "prop" is to be moved.

A further object of the invention is to support such an object at a plurality of points for movement about one of those points and to adjust the position of that point.

A further object of the invention is to determine the correct positioning of a plurality of supporting wheels for supporting such an object for movement about different pivotal centers.

A further object is to facilitate raising and lowering a mobile platform adapted to support a vehicle or other motion picture "prop" without the inconvenience of placing a jack under the platform and removing it each time the platform is raised and lowered.

A further object of the invention is to lock a supporting wheel in adjustable angular position in relation to its bracket while permitting adjustable cushioned movement of the load carried by the wheel.

A further object of the invention is to cushion the rocking movement of the platform while pivotally supporting the platform.

A further object of the invention is to adjust the position of the platform relative to the pivotal support so that the center of interest of the object supported will be substantially in line with such pivotal support.

For a detailed description of a preferred embodiment of the invention wherein the above and other objects are accomplished reference is had to the accompanying specification and drawings wherein:

Fig. 3 is a plan view of the support.

Fig. 4 is a sectional elevational view of the support and is taken along the lines 4—4 of Fig. 3.

Fig. 5 is a sectional elevational view through the support and is taken along the lines 5—5 of Fig. 3.

Fig. 6 is a sectional elevational view through one of the resilient wheel mounts, with a portion thereof in outline.

Fig. 7 is a sectional plan view of the resilient mount and is taken along the lines 7—7 of Fig. 6.

Fig. 8 is a sectional plan view taken along the lines 8—8 of Fig. 6.

Fig. 9 is a detailed elevational view of the auxiliary support, with parts in section.

Fig. 10 shows a card for determining the angular positions of the supporting wheels about their respective vertical axes in accordance with the position of the auxiliary support relative to the object supporting platform for permitting movement of the platform about the auxiliary support.

Figure 1:
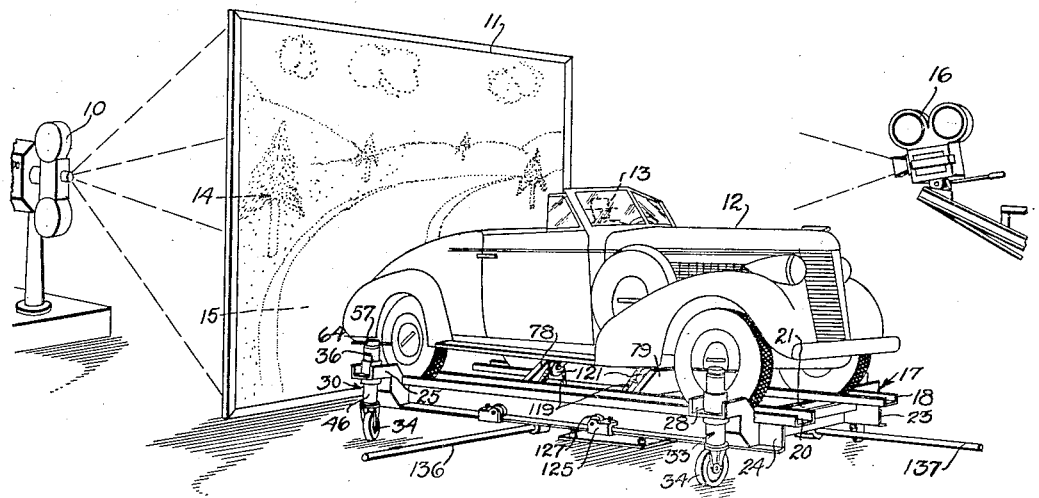
Fig. 1 is a perspective view of an arrangement for producing a "background projection" composite motion picture and embodying the present invention.

As the first step in producing a composite motion picture of the background projection type a background "key shot" is made of the locality or scene in which the foreground action is to be ultimately depicted. This may be made either a still or a motion picture. In the case of a "traveling shot" in which the ultimate composite picture has been apparently photographed from a moving vehicle, the scene comprising the key shot is photographed from the rear of a moving camera car by a motion picture camera resulting, of course in a motion picture. The film thus obtained is later processed and supplied to a moving picture projector as indicated at 10 in Fig. 1. The background scene is then projected upon the rear of a suitable translucent screen 11 as at 14. The foreground component, which in this case comprises an automobile 12 with an actor 13 seated therein, is provided in front of the screen 11 in correct position relative to the scene 14. That is, in the example illustrated, a road 15 is shown extending through the center of the picture. The car 12 is positioned directly before the picture of the road 15 so as to give the impression that the car was traveling along the road in the final composite picture. A motion picture camera 16 driven in synchronism with the projector 10, is supported at a suitable height before the auto 12 so as to photograph the foreground component, comprising the auto 12 and the actor 13, and the background component 14. The synchronous drive of the camera and projector may be effected through any suitable electrical or mechanical coupling as is well known in the art. During such photographic operation the car is jostled and turned in a manner to correspond with the depicted conditions of the road 15, thus simulating actual traveling conditions.

Referring now to Figs. 2 to 5, inclusive, the support comprises a stage or platform 17 including a pair of parallel runways 18 and 20, which runways are preferably formed of channels with the legs thereof extending upwardly to form wheel guides. Transversely extending beam members 21 and 22, also in the form of channels, are provided adjacent either end of the members 18 and 20, on the under surface thereof, and are suitably secured thereto as by welding to form a unitary piece. Directly under the lower surfaces of members 18 and 20 are a pair of strengthening channels 23 and 24, respectively, extending parallel with members 18 and 20 and secured thereto as by welding. Brackets 25, 26, 27 and 28, also formed of channels are provided co-extensive with the beams 21 and 22 and on which are carried resilient wheel mounts 30, 31, 32 and 33, respectively. A wheel 34 on the lower end of each of the wheel mounts 30 to 33, inclusive, is provided to support the stage 17 from a floor or supporting surface 35.

Referring now to Figs. 6 to 8, inclusive, each of the resilient wheel mounts 30 to 33, inclusive, comprises a casing or bearing member 36, having an annular flange 37 formed thereon. Casing 36 extends through an opening 39 formed in each of the brackets 25 to 28, inclusive, and has the flange 37 thereof secured to the bracket by bolts 38. A counterbored bearing surface 40 is formed in the lower portion of the inner circumference of casing 36 in which is journaled a bushing 41. An annular cap member 42, suitably secured to the lower surface of casing 36, as by screws 43, is provided to prevent endwise movement of the bushing 41 along the bearing surface 40. As indicated in Fig. 8 the inner surface of bushing 41 is splined or fluted as at 44 to receive a complementarily formed portion 45 formed on a sleeve member 46. The complementarily formed portions 44 and 45 on the bushing 41 and sleeve member 46, respectively, permit a longitudinal sliding motion between these two members while preventing a relative rotation therebetween. An annular flange 47 formed on the lower end of sleeve member 46 abuts a similar flange 48 and is secured thereto by screws, one of which is shown at 50. The wheel 34 is carried upon a shaft 52, rotatably journaled within bearing brackets 53 and 54 depending from the flange 48 on either side of wheel 34. A stud member 55 extending longitudinally of the sleeve 46 is suitably secured to the central portion of the flange 47 and has its upper end portion slidably received within a bearing 56 formed in a cap member 57. A pair of lock nuts 58 and 59 are threadably secured to the upper end portion of stud member 55 and are adapted to engage the top surface of the bearing 56 when no load is applied to stage 17 or when, for any other reason, the sleeve 46 is at the lower limit of its travel. Cap member 57 has a helical thread 60 formed on the outer circumference thereof which is adapted to engage a similar internal thread 61 formed in the upper portion of the inner circumference of casing 36. An annular well 62 is formed in the cap member 57 to receive a compression spring 63. Spring 63 engages at its lower end the flange 47 of sleeve member 46, and at its upper end the cap member 57 so as to resiliently support the bracket 25 upon its respective wheel. A handle 64 extends transversely through cap member 57 to permit the member 57 to be screwed up or down so as to vary the spring pressure between the bracket 25 and its respective wheel 34. The upper end of casing 36 is split as at 65 (Fig. 7) with a pair of extending lug members 66 and 67 formed on either side of the split portion. A clamp screw 68 passes through the lug 67 and is threadably secured within the other lug 66. After the cap member 57 is screwed to a desired position, the clamp screw 68 is tightened to frictionally lock the member 57.

Referring to Fig. 8, the lower end portion of casing 36 is also split as at 69. A pair of lugs 70 and 71 are formed on the casing 36 on either side of the split 69. A clamp screw 72, having a hand knob 73 thereon, is passed through an opening formed in lug 71 and is threadably secured within the other lug 70. Tightening of the screw 72 frictionally locks the bushing 41 in any angular position within the bearing surface 40 of the casing 36.

Indicia 74 calibrated in degrees are formed along the outer circumference of the flanges 47 and 48, which co-act with a stationary reference point 75 formed on the cap member 42 to indicate the angular position of the wheel 34 about a vertical axis in relation to the stage 17.

Referring now to Figs. 2, 3, 5 and 9, an auxiliary support is provided to support the stage 17 and comprises a pair of spaced, transversely extending channel members 78 and 79. Members 78 and 79 extend under the longitudinal runway channels 18 and 20 and are spaced apart by means of angle members 80, 81, 82, 83, 84, and 85, suitably secured thereto as by welding. It should be noted, however, that neither the members 78 and 79, nor the angle members 81 and 84 are secured to the channels 18 and 20. The angles 81 and 84 form guiding surfaces which are adapted to slide against the sides of the runway members 18 and 20, respectively. An inverted channel member 86 extends between the two angle members 82 and 83 and has the legs thereof suitably secured to such members 82 and 83 as by welding. Brackets 124 and 125 extending outwardly from the under surface of each of the channel members 78 and 79 rotatably support rollers 126 and 127, respectively, which are adapted to support the auxiliary support from the channel members 23 and 24 when the auxiliary support is not supporting the stage 17. A lock screw 128 (Fig. 2) is threaded into each of brackets 124 and 125 to lock the channels 78 and 79 to the channels 18 and 20. A pad 87 secured to the channel member 86 as by bolts 88 has a socket 89 formed thereon which receives a ball-shaped end portion 90 of a hydraulic jack piston 91. Piston 91 is slidable within a cylinder 92 of an elevator or jack generally indicated at 93. Jack 93 may be of any suitable construction, but for the purpose of illustration, comprises a pump plunger 94 reciprocable within a plunger cylinder 95 formed in a casting 96 which also forms part of the piston cylinder 92. A conduit 97, having a spring pressed check valve 98 provided therein, communicates the plunger cylinder 95 with a piston cylinder 92. A conduit 100 co-extensive with the conduit 97 and also having a spring-pressed check valve 101 provided therein, communicates the plunger cylinder 95 with a fluid containing reservoir 102. On the upward stroke of the plunger 94 a portion of the fluid within reservoir 102 is drawn through the conduit 100, past the check valve 101, and into the plunger cylinder 95. On the downward stroke of the plunger 94, the fluid within the cylinder 95 is forced through the conduit 94, past the check valve 98, and into the piston cylinder 92, thus raising the piston 91 and consequently the platform 17. A conduit 104 communicating the cylinder 92 with the reservoir 102 has a normally closed valve 103 provided therein which is operated by a handle 105 (Fig. 5). When it is desired to release the jack the valve 104 is opened allowing the fluid to flow from the cylinder 92 to the reservoir 102. The plunger 94 is pivotally attached at its upper end to an intermediate point on a horizontally extending link 107, one end of which is pivotally mounted on the upper end of a vertically extending link 108. The lower end of link 108 is pivotally mounted upon a boss formed on the pump cylinder 92. The link 107 is also pivoted at 109 to a third link 110, which in turn is pivoted at 111 upon an eccentric or crank disc 112 carried by a shaft 113. Shaft 113 is driven through a speed reduction unit 114 by an electric motor 115. The reduction unit 114 comprises a worm gear 116 secured to shaft 113 and meshing with a worm 117. Worm 117 is suitably secured to the shaft of motor 115. Rotation of motor 115 is controlled by a suitable remote control switch (not shown) to rotate crank disc 112 and consequently cause a reciprocation of plunger 94 to pump the hydraulic fluid into the cylinder 92.

The jack 93 and motor 115 are carried on a base 118 which is adapted to rest on the supporting surface 35. Elastic cables 119 are each secured at one end 120 to the corners of the base 118 and pass around freely rotatable pulley 121 rotatably carried by brackets 122 depending from the angle members 82 and 83. The other ends of the cables 119 are secured at 123 to the angle members 81 and 84 so as to resiliently urge the base 118 upwardly out of contact with the supporting surface 35 when the valve 104 (Fig. 9) of the jack 93 is opened.

In operation the cap member 57 of each of the resilient wheel mounts is screwed up or down to adjust the resiliency of the supporting spring 63 in accordance with the weight of the object to be supported and/or in accordance with the frequency and amount of rocking movement it is desired to impart to the object. Generally, for heavy objects or for small jerky movements of the object, the cap member 57 is screwed down thus compressing the spring 63 and making it stiffer while for light objects, or where the rocking movement is to be of a slow, gentle, oscillating manner the pressure on the spring 63 is lightened by screwing the member 57 upward. In the event that the spring 63 does not permit a sufficient range of resiliency for different weights of objects or different types of rocking movements, stiffer or weaker springs may be substituted.

If the object to be supported during photography is a vehicle as in the illustration, it may be driven over a ramp (not shown) and onto the runways 18 and 20. However, if the object is of a different nature, for example a boat or a portion of a motion picture set, it may be supported on the runways 18 and 20 by a suitable cradle or framework (not shown).

The support is correctly positioned in front of the translucent screen in any suitable manner. For example, the wheels 34 may be employed by opening the valve 103 of jack 93 thus causing the jack to be released, permitting the cables 119 to retract the base 118 of the auxiliary support upwardly sufficient to allow the support to be wheeled to its correct position.

When the support is correctly positioned before the screen 11 or other background scene, the clamp screws 128 are released to permit the entire auxiliary support to be carried by the rollers 127 on the lower flanges of the channels 23 and 24, in which condition the auxiliary support may be moved until the universal joint comprising the ball 90 and socket 89, assumes a position directly under the main center of interest, which in this case is the actor 13 seated in the automobile 12. The clamp screws 128 are then tightened and the jack 93 is raised a sufficient amount to partly support the load carried by the wheel mounts 30 to 33, inclusive.

In the event that the object is to be moved horizontally about the center of interest thereof, or in other words, about the ball 90, the wheels 34 are adjusted about the vertical axes of their respective wheel mounts until their turning radii coincide with the ball 90. This operation is facilitated by the use of a chart 130 (Fig. 10) in conjunction with a calibrated scale 131, provided along the channel 20 (Fig. 2) and the scales 74 provided on each of wheel mounts 30 to 33, inclusive. The distance at which the universal joint comprising the ball 90 is offset from the middle of the runways 18 and 20 is determined by the reading of the scale 131, calibrated in feet and inches from the middle of the runway 20, opposite a suitable reference mark 132 provided on the auxiliary support. The column 133 of chart 130 is then referred to and the line thereon indicating the distance from the center or middle of the runways which coincides with the distance found on the scale 131 is noted. On the same line but in the next column 134 will be found the angular setting of the wheels nearest the pivot of the auxiliary support, while in the last column 135 of the same line will be found the angular setting of the wheels farthest from the pivot. For example, in the illustration the pivot center is found on reference to the scale 131 to be nine inches on one side of the middle of the runways 18 and 20. The reading "54° 10'" in the column 134 on the same line thus indicates the settings of the wheels carried by the near wheel mounts 30 and 31, these settings being determined by the scales 74 in reference to their respective index points 75. Correspondingly, the settings of the wheels carried by the far wheel mounts 32 and 33 will be found in the last column 135 to be "61° 2'".

During photographing the support and the object supported thereby are rocked and otherwise moved by attendants through bars 136 and 137 (Fig. 1) securely fastened in any suitable manner to the under surface of the channels 21, 22, 23 or 24.

Figure 11:
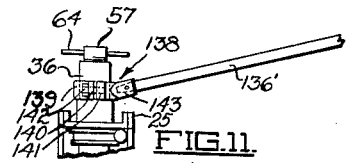
Fig. 11 is a fragmentary view showing an adjustable bracket secured to one of the wheel mounts for securing a rocking bar to the wheel mount.
Figure 2:
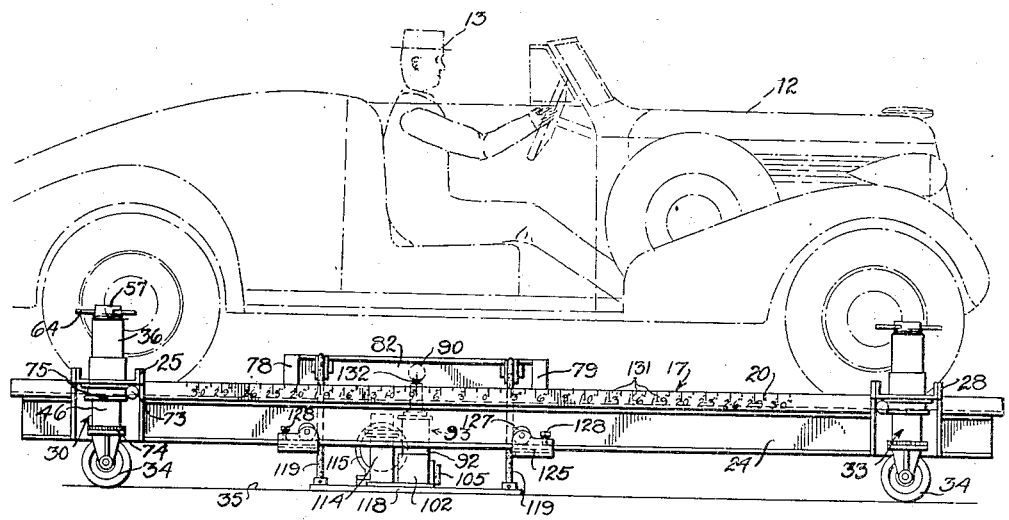
Fig. 2 is a side elevational view of the movable support embodying the invention.

Fig. 11 shows an adjustable bracket 138 for securing a rocking bar 136' to a casing 36 of each of the wheel mounts 30 to 33, inclusive, instead of to the channels 21 to 24, inclusive. Bracket 138 comprises a split sleeve 139 having lugs 140 and 141 projecting therefrom on either side of the split portion of the sleeve. A clamping bolt 142 passes through an aperture in the lug 140 and is threaded in the other lug 141 to clamp the sleeve 139 in any angular position about the casing 36. A projection 143 extending from the sleeve 139 has a socket provided therein for receiving one end of the bar 136'.

In certain types of photographic "shots", for example, where it is not necessary or desirable that a certain point of the object be given a minimum amount of rocking movement, the jack 93 of the auxiliary support may be released allowing the cables 119 to support the base 118 clear of the floor and permitting the entire weight of the support and the supported object to be carried by the wheels 34.

Furthermore, where the type of photography requires a lateral or longitudinal shift of the object or foreground component, the base 118 of the auxiliary support may be raised clear of the floor and the wheels 34 all directed parallel to the direction in which the object is to be moved.

Having thus described the invention, what is claimed as new and desired to be secured by Letters Patent is:

1. A support comprising the combination of an object supporting stage, means for supporting said stage from a floor, a jack connected to said stage and adapted to rest stationary on said floor, a motor connected to said jack for operating said jack to raise said stage, and means operative on release of said jack to raise said jack and said motor clear of said floor.

2. A support comprising the combination of an object supporting stage, wheels for supporting said stage from a supporting surface, a jack carriage movable along said stage, a jack connected to said carriage at a point above the level of said stage and adapted to rest stationary on said surface, a motor and pump operatively connected to said jack for operating said jack to raise said stage, and resilient means responsive to the release of said jack for raising said jack and said motor and said pump clear of said surface.

3. A support comprising the combination, with a supporting stage including a pair of parallel bar members and wheels for supporting said members from a supporting surface, of a supporting frame for supporting said members, an elevator device connected to said frame above the level of said bar members and adapted to rest on said surface, to raise said frame, means interconnecting said elevator device and said frame and adapted to raise said elevator device clear of said surface, and means for supporting said frame on said members when said elevator device is retracted, said last mentioned means permitting adjustment of said frame along said members.

4. A support in accordance with claim 3 wherein a pivotal connection is provided between said elevator device and said frame.

5. A support comprising the combination, with an object supporting stage including a pair of parallel bar members having a vehicle track above a jack track and wheels for supporting said members from a supporting surface, of a supporting frame associated with said members, a jack connected to said frame above the level of said bar members and adapted to be supported on said surface for raising said frame to raise said stage, means for raising said jack from said surface and for supporting said jack by said frame, and rollers rotatably carried by said frame and adapted to rest on said jack track when said jack is supported by said frame whereby said frame may be moved along said bar members.

6. A support comprising the combination of an object supporting stage, a frame associated with said stage, means comprising a base with a motor, pump and jack thereon for raising said frame to raise said stage, means for supporting said base by said frame, rollers rotatably carried by said frame and adapted to rest on said stage when said first mentioned means is supported by said frame, said rollers permitting said frame to be adjusted along said stage.

7. A support comprising an object carrying member, a plurality of wheels for supporting said member from a floor, means whereby each of said wheels may be moved about a vertical axis, a stationary support for additionally supporting said member from said floor, a pivotal connection between said stationary support and said member whereby said member is adapted to be moved about said connection, means whereby said member is adapted to be adjustably positioned relative to said connection to change the center of rotation of said member, indicia co-operating with said member to indicate the position thereof relative to said pivotal connection, and means co-operating with said indicia for determining the angular positions of said wheels about their respective vertical axes, whereby the centers of vertical turning radius of said wheels coincide with said pivotal connection.

8. A support comprising a load carrying member, a plurality of wheels for supporting said member and resilient means intermediate each of said wheels and said member, said means comprising a vertically extending bearing, a sleeve rotatably journaled in said bearing, a member supported by one of said wheels, said member being slidable within said sleeve, means for preventing relative rotation between said member and said sleeve, resilient means acting longitudinally between said bearing and said last mentioned member, and means adapted to lock said sleeve in a predetermined angular position relative to said bearing.

9. A support in accordance with claim 8 wherein means are provided for adjustably varying the resilience of said resilient means.

10. A resilient connection for supporting an object upon a wheel comprising a bearing member, a sleeve rotatably journaled in said member, means for preventing longitudinal movement between said sleeve and said member, an element supported by said wheel and slidable longitudinally in said sleeve, means for preventing relative rotation between said element and said sleeve, a spring retaining member carried by said bearing member, a compression spring between said element and said spring retaining member, said spring retaining member being adjustable toward and away from said element, and means for locking said sleeve in relation to said bearing member.

11. A support comprising a frame having channel side and end members, said end channel members extending laterally beyond said side members, a plurality of wheels, means in each laterally extended portion of said end members for supporting one of said wheels for rotation about a vertical axis, resilient means for each of said wheels, means for locking each of said wheels in a selected angular position about its vertical axis, a carriage movable along said side members, a motor, pump and jack unit movable with said carriage, a pivotal connection between said jack and said carriage at a point above the level of said side members, means supporting said unit from said carriage when said jack is retracted, and cooperating indicia associated with said pivotal connection and with said wheels for adjusting the centers of vertical turning radius of said wheels to coincide with said pivotal connection.

BYRON C. HASKIN.